United States Patent
Meng et al.

(10) Patent No.: US 10,284,426 B2
(45) Date of Patent: May 7, 2019

(54) METHOD AND APPARATUS FOR PROCESSING SERVICE NODE ABILITY, SERVICE CLASSIFIER AND SERVICE CONTROLLER

(71) Applicant: ZTE CORPORATION, Shenzhen (CN)

(72) Inventors: Wei Meng, Shenzhen (CN); Cui Wang, Shenzhen (CN); Yuehua Wei, Shenzhen (CN)

(73) Assignee: ZTE Corporation, Shenzhen (CN)

(*) Notice: Subject to any disclaimer, the term of this patent is extended or adjusted under 35 U.S.C. 154(b) by 38 days.

(21) Appl. No.: 15/501,938

(22) PCT Filed: Sep. 24, 2014

(86) PCT No.: PCT/CN2014/087355
§ 371 (c)(1),
(2) Date: Feb. 6, 2017

(87) PCT Pub. No.: WO2015/154393
PCT Pub. Date: Oct. 15, 2015

(65) Prior Publication Data
US 2017/0230246 A1    Aug. 10, 2017

(30) Foreign Application Priority Data
Aug. 5, 2014  (CN) .......................... 2014 1 0382759

(51) Int. Cl.
*H04L 12/24* (2006.01)
*H04L 29/08* (2006.01)
*H04L 12/46* (2006.01)
*H04L 12/721* (2013.01)

(52) U.S. Cl.
CPC ...... *H04L 41/0869* (2013.01); *H04L 12/4633* (2013.01); *H04L 45/26* (2013.01); *H04L 67/327* (2013.01)

(58) Field of Classification Search
CPC ............... H04L 41/0869; H04L 67/327; H04L 12/4633; H04L 45/26
See application file for complete search history.

(56) References Cited

U.S. PATENT DOCUMENTS

| 8,214,493 B2 | 7/2012 | Zhang et al. |
| 2008/0177896 A1* | 7/2008 | Quinn ................... G06F 9/5055 709/238 |

(Continued)

FOREIGN PATENT DOCUMENTS

| CN | 101127713 | 2/2008 |
| CN | 103905447 | 7/2014 |
| CN | 103929492 | 7/2014 |
| WO | 2008088954 | 7/2008 |

OTHER PUBLICATIONS

Li, Jul. 2014, Service Function Control Framework, pp. 1-11.*

(Continued)

*Primary Examiner* — Lakeram Jangbahadur
(74) *Attorney, Agent, or Firm* — Plumsea Law Group, LLC

(57) ABSTRACT

A service node capability processing method and apparatus, a service classifier and service controller are described. The method includes: determining an exchange information set of service nodes on a service function chaining for processing a data packet, wherein the exchange information set includes an intersection of capabilities of the service nodes on the service function chaining; and encapsulating the exchange information set in the data packet, wherein the exchange information set is used for the service nodes to read a processing result which is obtained by processing capability corresponding to the intersection of the capabilities of the service nodes and which is encapsulated in the data packet. In such a fashion, the problem in the related technology is addressed that the blind information exchange causes the waste of resources since the information (Continued)

exchange between nodes is untargeted, and consequentially effectively avoids the waste of field resources by invalid information exchange.

11 Claims, 10 Drawing Sheets

(56) References Cited

U.S. PATENT DOCUMENTS

| | | |
|---|---|---|
| 2010/0165985 A1 | 7/2010 | Sharma et al. |
| 2013/0287022 A1* | 10/2013 | Banavalikar ............ H04L 45/00 370/389 |
| 2016/0373300 A1* | 12/2016 | Liu ..................... H04L 41/0823 |
| 2017/0019341 A1 | 1/2017 | Huang et al. |
| 2017/0048148 A1 | 2/2017 | Huang et al. |

OTHER PUBLICATIONS

International Search Report for PCT/CN2014/087355, English Translation attached to original, Both completed by the Chinese Patent Office dated Apr. 27, 2015 All together 5 Pages.

Extend European Search Report for EP 14888913.2, completed by the European Patent Office dated May 26, 2017 All together 10 Pages.

H. Li et al.,11 Pages, "Service Function Chain control framework draft-ww-sfc-control-plane-01".

* cited by examiner

METHOD AND APPARATUS FOR PROCESSING SERVICE NODE ABILITY, SERVICE CLASSIFIER AND SERVICE CONTROLLER

CROSS-REFERENCE TO RELATED APPLICATION

This application is the U.S. national phase of PCT Application No. PCT/CN2014/087355 filed Sep. 24, 2014, which claims priority to Chinese Application No. 201410382759.0 filed Aug. 5, 2014, the disclosures of which are incorporated in their entirety by reference herein.

TECHNICAL FIELD

The present disclosure relates to the field of communications, and in particular to a service node capability processing method and apparatus, a service classifier and a service controller.

BACKGROUND

Service Function Chaining SFC is a network technology which is being researched and standardized currently. Since data center networks developed into overlay networks, network edge has become the boundary point of a virtual network and a physical network, herein network edge is a server or a ToR, or may be a gateway. However, Overlay technology does not solve all the problems, in a data center, there are a plenty of pieces of middleware, for example, firewalls/load balancers, which perform process based on user services. It is apparently impractical to traverse the middleware through tunnels.

The deployment model of a data center requires the arbitrary deployment of a virtual firewall/load balancer in a network, that is, the deployment of a virtual firewall/load balancer is independent from the topology of a network. That gives rise to a new problem about how to make traffic flexibly pass through a virtual firewall/load balancer for processing. To deal with the problem, a new type of middleware, that is, a virtual firewall/load balancer, is generated which is deployed at the edge of a network and may be realized by a standard server.

In the related technology, service processing functions such as virtual firewall/load balancer/gateway are referred to as Service Function SF, and traffic is processed by a series of service functions to form a service function chaining SFC. FIG. 1 is a schematic diagram of an SFC according to the related technology. As shown in FIG. 1, the arrowed solid line and the arrowed dotted line represent two SFCs respectively.

In the related technology, currently, the frame of an SFC may be basically divided into the following elements:

1: Service Overlay: an Overlay technology that various network edge nodes need to communicate:

2: Generic Service Control Plane GSCP: a controller for forming an SFC;

3: Service Classifier: a service classifier needs to perform flow recognition, and carries out a specific SFC processing for a specific flow;

4: Dataplane Metadata: dataplane metadata is a major characteristic of SFC, Metadata allows exchange information to be transferred and shared between a service classifier and an SF, between SFs, between an SF and an external system, and among edge service processing nodes, thereby achieving the purpose of processing a specific service.

5: Service Function Path SFP: FIG. 2 is a diagram exemplifying an SFP according to the related technology, and as shown in FIG. 2, an SFP is a service processing path starting from a service classifier, passing through a plurality of service function instances and arriving at a destination.

Therefore, in the related technology, the service function and the forwarding function of a network device are separated to realize the independent operation and processing of the service function and improve the forwarding performance of the network device.

Further, in related SFC technology, Dataplane Metadata is a data area in which the exchange information between nodes is stored. Thus, besides the packet transferred between the SFs in an SFC, the exchange information of the SF in the SFC may be stored in Dataplane Metadata so that the calculation result of a previous node may be acquired by the following node conveniently to avoid repeated calculation. Metadata will be sent to the next processing unit together with packets. FIG. 3 is a diagram exemplifying the encapsulation of Dataplane Metadata as the content of a packet according to the related technology. As shown in FIG. 3, Dataplane Metadata may be encapsulated into a packet and sent together with the packet. FIG. 4 is a diagram exemplifying Dataplane Metadata as an independent message according to the related technology. As shown in FIG. 4, Dataplane Metadata may also be used as an independent message body to be sent in parallel with a packet.

For example, service classifier→SF1→SF2 is a part of a service function path (SFP for short). A packet is processed by an SF1 first and then by an SF2. As both of the SF1 and the SF2 need to search the same ACL table, an ACL table item search process will be separately executed by the SF1 and the SF2, which causes a repeated search by the SF2. In the case of the storage of exchange information in Metadata, after searching an ACL, the SF1 places the result of the search in Metadata, encapsulates the Metadata in a packet and then sends the packet to the SF2. After receiving the Metadata, the SF2 directly acquires the ACL search result from the Metadata to use, thus avoiding a repeated ACL search process and consequentially improving the packet forwarding performance in an SFC.

However, in the related technology, the SF1 is unaware of whether the SF2 needs the ACL search result. Moreover, the table items searched for by the SF1 may be other types, but not limited to the ACL, thus, information is not exchanged in a targeted way, and the blind information exchange causes the waste of resources.

Therefore, in the related technology, as information is not exchanged in a targeted way, the blind information exchange leads to a problem of the waste of resources.

SUMMARY

The present disclosure provides a service node capability processing method and apparatus, a service classifier and a service controller to at least address the problem in the related technology that the blind information exchange causes the waste of resources since the information exchange between nodes is untargeted.

In accordance with an aspect of the present disclosure, a service node capability processing method is provided which includes the following steps: determining an exchange information set of the service nodes on a service function chaining for processing a data packet, herein the exchange information set includes an intersection of the capabilities of the service nodes on the service function chaining; and encapsulating the exchange information set in the data packet, herein the exchange information set is used for the service nodes to read a processing result which is obtained by processing a capability corresponding to the intersection of the capabilities of the service nodes and which is encapsulated in the data packet.

In an exemplary embodiment, determining an exchange information set of the service nodes on a service function chaining for processing a data packet includes the following steps: determining the capabilities of various service nodes on the service function chaining; and selecting a same capability of at least two service nodes as the intersection of the capabilities of the service nodes.

In an exemplary embodiment, the exchange information set is encapsulated in the data packet through at least one of the following manners: in a manner of a bitmap format, and in a manner of a queue format.

In accordance with another aspect of the present disclosure, a service node capability processing method is provided which includes: receiving a data packet carrying an exchange information set of service nodes on a service function chaining, herein the exchange information set includes an intersection of capabilities of the service nodes on the service function chaining; and reading, according to the exchange information set, a processing result which is obtained by processing a capability corresponding to the intersection of the capabilities between the service nodes and which is encapsulated in the data packet.

In an exemplary embodiment, after the step of reading, according to the exchange information set, a processing result which is obtained by processing a capability corresponding to the intersection of the capabilities of the service nodes and which is encapsulated in the data packet, the method further includes determining that the service node includes an intermediate node capability of which a processing result is not encapsulated in the data packet but the intermediate node capability is included in the exchange information set; processing the intermediate node capability to acquire an intermediate node capability processing result; and encapsulating the intermediate node capability processing result in a data packet to be forwarded to the next service node.

In an exemplary embodiment, after the step of reading, according to the exchange information set, a processing result which is obtained by processing a capability corresponding to the intersection of the capabilities of the service nodes and which is encapsulated in the data packet, the method further includes: executing at least one of the following operations for the capability included in the exchange information set: addition, deletion and modification.

In accordance with still another aspect of the present disclosure, a service node capability processing apparatus is provided which includes the following modules. A first determination module is arranged to determine an exchange information set of service nodes on a service function chaining for processing a data packet, herein the exchange information set includes an intersection of capabilities of the service nodes on the service function chaining. A first encapsulation module is arranged to encapsulate the exchange information set in the data packet, herein the exchange information set is used for the service nodes to read a processing result which is obtained by processing a capability corresponding to the intersection of the capabilities of the service nodes and which is encapsulated in the data packet.

In an exemplary embodiment, the first determination module includes the following units. A determination unit is arranged to determine the capabilities of various service nodes on the service function chaining. A selection unit is arranged to select a same capability of at least two service nodes as the intersection of the capabilities of the service nodes. In accordance with yet another aspect of the present disclosure, a service classifier is provided which includes any foregoing apparatus.

In accordance with yet still another aspect of the present disclosure, a service controller is provided which includes any foregoing apparatus.

In accordance with yet still of the present disclosure, a service node capability processing apparatus is provided which includes the following modules. A receiving module is arranged to receive a data packet carrying an exchange information set of service nodes on a service function chaining, herein the exchange information set includes an intersection of capabilities of the service nodes on the service function chaining. A reading module is arranged to read, according to the exchange information set, a processing result which is obtained by processing the capability corresponding to the intersection of a capabilities of the service nodes and which is encapsulated in the data packet.

In an exemplary embodiment, the apparatus further includes the following modules. A second determination module is arranged to determine that the service node includes an intermediate node capability of which a processing result is not encapsulated in the data packet but the intermediate node capability is included in the exchange information set. A processing module is arranged to process the intermediate node capability to acquire an intermediate node capability processing result. A second encapsulation module is arranged to encapsulate the intermediate node capability processing result in a data packet to be forwarded to the next service node.

In an exemplary embodiment, the apparatus further includes: an execution module arranged to execute at least one of the following operations for the capability in the exchange information set: addition, deletion and modification.

In accordance with yet still another aspect of the present disclosure, a service node is provided which includes any foregoing apparatus.

In the present disclosure, an exchange information set of the service nodes on the service function chaining for processing a data packet is determine, herein the exchange information set includes an intersection of the capabilities of the service nodes on the service function chaining; and the exchange information set is encapsulated in the data packet, herein the exchange information set is used for the service nodes to read a processing result which is obtained by processing the capability corresponding to the intersection of the capabilities of the service nodes and which is encapsulated in the data packet. The present disclosure addresses the problem in the related technology that the blind information exchange causes the waste of resources since the information exchange between nodes is untargeted, and consequentially effectively avoids the waste of field resources by invalid information exchange.

DESCRIPTION OF DRAWINGS

The accompanying drawings described herein which are incorporated into and form a part of the application are provided for the better understanding of the present disclosure, and exemplary embodiments of the present disclosure and the description of the exemplary embodiments serve to illustrate the present disclosure but are not to be construed as improper limitations to the present disclosure. In the accompanying drawings.

DETAILED DESCRIPTION

The present disclosure will be described below in detail with reference to accompanying drawings when read in conjunction with specific embodiments. It shall be illustrated that the embodiments of the present disclosure and the features thereof can be combined with each other if no conflict is caused.

Figure 1:
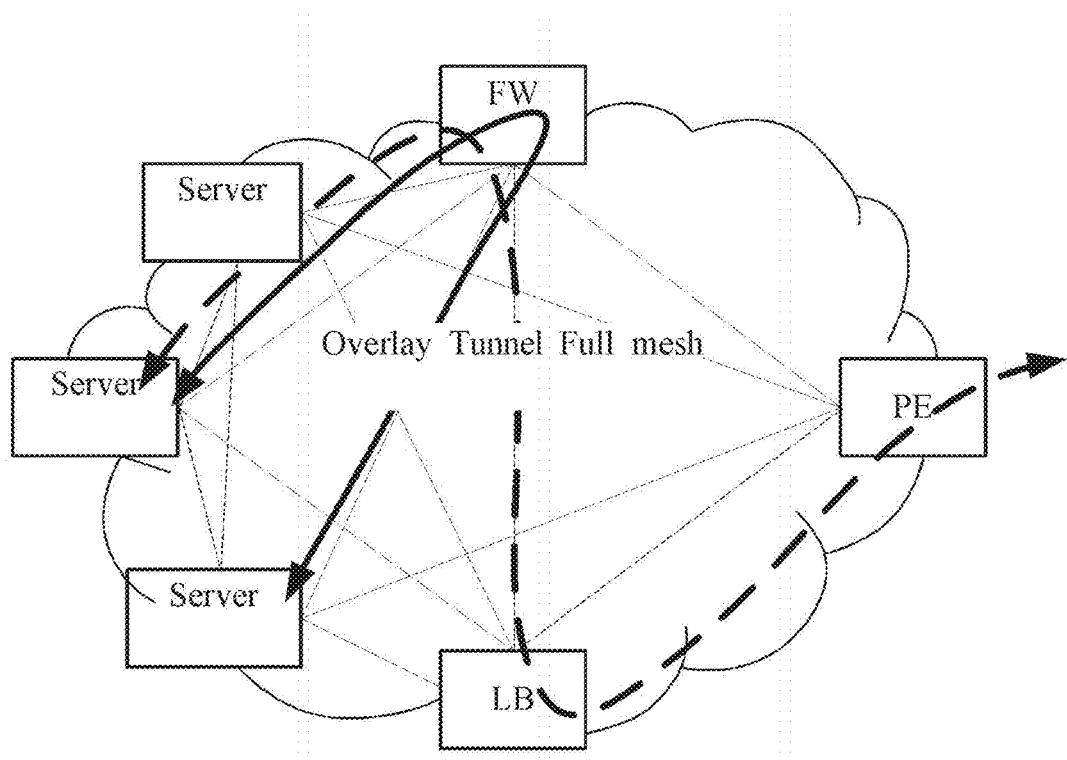
FIG. 1 is a schematic diagram exemplifying a service function chaining according to the related technology.
Figure 2:
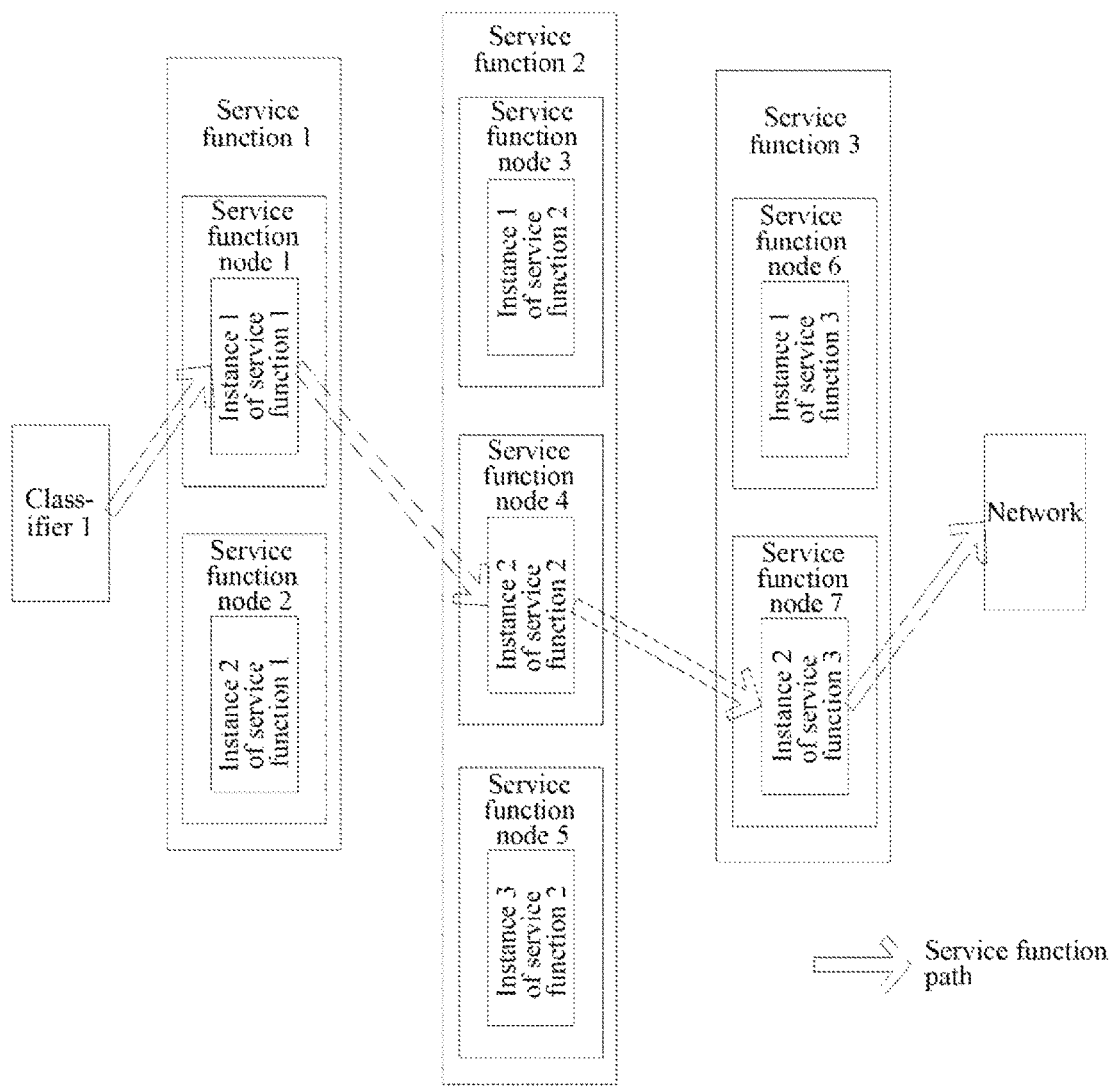
FIG. 2 is a diagram exemplifying a service function path according to the related technology.
Figure 3:
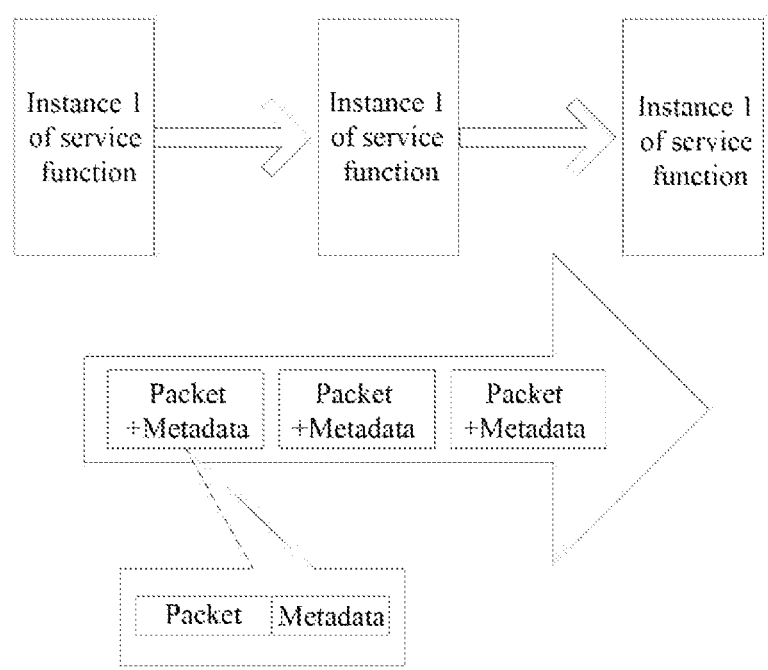
FIG. 3 is a diagram exemplifying the encapsulation of Dataplane Metadata as the content of a packet according to the related technology.
Figures 4, 5:
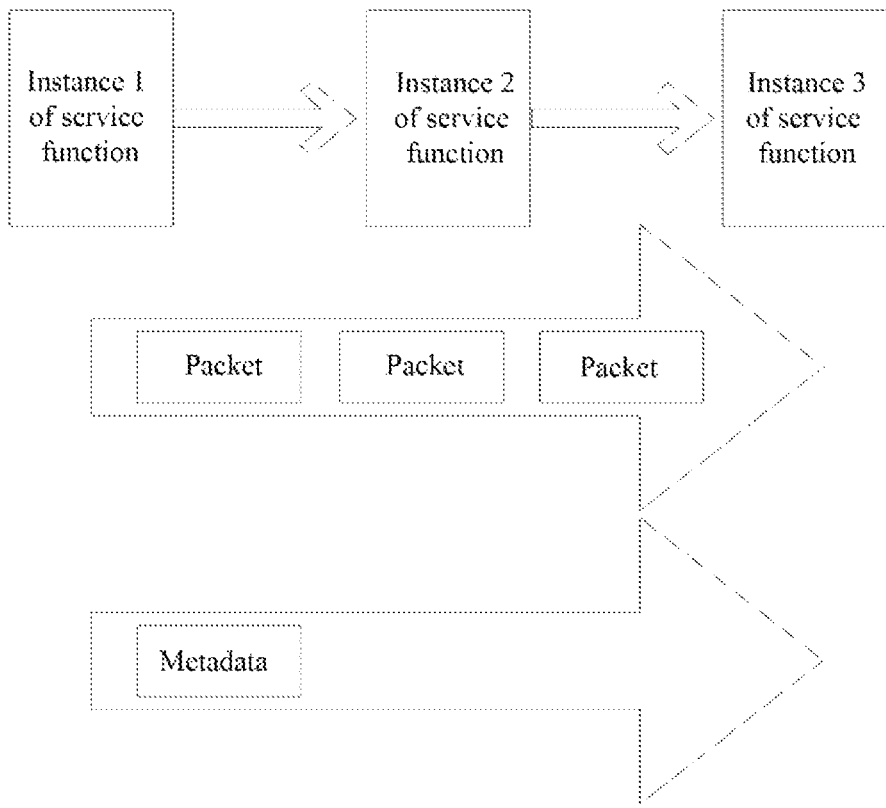
FIG. 4 is a diagram exemplifying Dataplane Metadata as an independent message according to the related technology.
FIG. 5 is a flowchart illustrating a first service node capability processing method according to an embodiment of the present disclosure.

A service node capability processing method is provided in the embodiment. FIG. 5 is a flowchart illustrating a first service node capability processing method according to an embodiment of the present disclosure. As shown in FIG. 5, the flow includes the following steps.

In step S502, an exchange information set of the service nodes on a service function chaining for processing a data packet is determined, herein the exchange information set includes an intersection of capabilities of the service nodes on the service function chaining.

In step S504, the exchange information set is encapsulated in the data packet, herein the exchange information set is used for the service nodes to read a processing result which is obtained by processing a capability corresponding to the intersection of the capabilities of the service nodes and which is encapsulated in the data packet.

By executing the foregoing steps to encapsulate an exchange information set including the intersection of the capabilities of the service nodes on the service function chaining in a data packet so that the service nodes can directly read a processing result which is obtained by processing the capability corresponding to the intersection of the capabilities of the service nodes and which is encapsulated in the data packet. That is, the exchange information set is placed in a data packet, so that valid exchange information can be transferred between service nodes. Therefore, the service node capability processing method addresses the problem in the related technology that the blind information exchange causes the waste of resources since the information exchange between nodes is untargeted, and consequentially effectively prevents the waste of field resources by invalid information exchange.

It shall be illustrated that the service node may have a plurality of capabilities, for example, may be a capability of processing the table items of the service node, a capability of processing a certain parameter in the table items or a capability of executing a parameter configuration for the service node aiming at a specific service, and no specific limitations are given here to the capabilities.

When determining an exchange information set of the service nodes on a service function chaining for processing a data packet, a plurality of ways may be used, for example, the capabilities of various service nodes on the service function chaining may be determined first, and then the same capability of at least two service nodes is selected as the intersection of the capabilities of the service nodes. Herein, it shall be illustrated that the intersection may be specifically selected according to the number of the service nodes having the same capability, for example, the same capability which two service nodes have is determined as the intersection, or the same capability which three or more service nodes have is determined as the intersection. The intersection is determined depending upon a specific demand.

Further, the exchange information set for recording an intersection of capabilities may be encapsulated in the data packet in a plurality of manners. For example, the data packet may be encapsulated in at least one of the following manners: a manner of a bitmap format, or a manner of a queue format.

Figure 6:
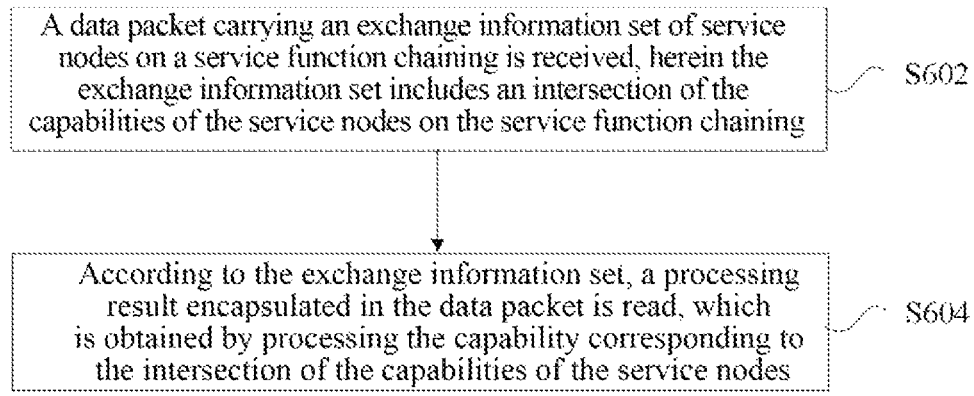
FIG. 6 is a flowchart illustrating a second service node capability processing method according to an embodiment of the present disclosure.

A service node capability processing method is provided in the present embodiment. FIG. 6 is a flowchart illustrating a second service node capability processing method according to an embodiment of the present disclosure. As shown in FIG. 6, the flow includes the following steps.

In step S602, a data packet carrying an exchange information set of the service nodes on a service function chaining is received; herein the exchange information set includes an intersection of the capabilities of the service nodes on the service function chaining.

In step S604, a processing result which is obtained by processing the capability corresponding to the intersection of the capabilities of the service nodes and which is encapsulated in the data packet is read according to the exchange information set.

By executing the foregoing steps, the service nodes read the processing result which is obtained by processing the capability corresponding to the intersection of the capabilities of the service nodes and which is encapsulated in the data packet according to the exchange information set, such that effective exchange information is transferred among service nodes. Therefore, the service node capability processing method addresses the problem in the related technology that the blind information exchange causes the waste of resources since the information exchange between nodes is untargeted, and consequentially effectively prevents the waste of field resources by invalid information exchange.

In an exemplary embodiment after the step that a processing result which is obtained by processing the capability corresponding to the intersection of the capabilities of the service nodes and which is encapsulated in the data packet is read according to the exchange information set, the following processing may also be executed. At first it is judged that whether a service node has a capability required to be processed by the service node itself. If the result of the judgment is 'yes', that is, it is determined that the service node includes an intermediate node capability of which a processing result is not encapsulated in the data packet but the intermediate node capability is included in the exchange information set, then the intermediate node capability is processed to acquire an intermediate node capability processing result. The intermediate node capability processing result is encapsulated in a data packet to be forwarded to the next service node. In such a way, it is convenient for the subsequent service nodes to improve the efficiency of the processing of the same capability, that is, the subsequent service nodes only need to read the result of the processing of the capability from the received packet.

It should be pointed out that, after a processing result which is obtained by processing the capability corresponding to the intersection of the capabilities of the service nodes and which is encapsulated in the data packet is read according to the exchange information set, at least one of the following operations may be executed for the capability included in the exchange information set: addition, deletion and modification, and the operations executed are changed flexibly as required.

A service node capability processing apparatus is also provided in the present embodiment for realizing the foregoing embodiments and alternative implementations, and what has been described above will not be repeated here. The term 'module', as used hereinafter, can achieve the combination of software and/or hardware with predetermined functions. Although the apparatuses described in the following embodiments are preferably implemented as software, the implementation of the apparatuses as hardware or the combination of software and hardware may also be conceived.

Figure 7:
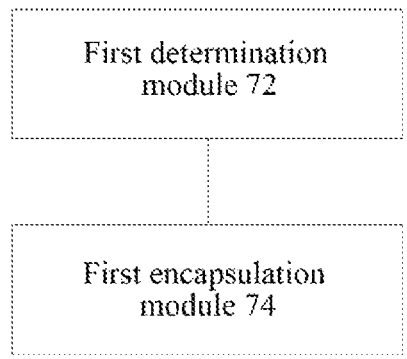
FIG. 7 is a block diagram illustrating the structure of a first service node capability processing apparatus according to an embodiment of the present disclosure.

FIG. 7 is a block diagram illustrating the structure of a first service node capability processing apparatus according to an embodiment of the present disclosure. As shown in FIG. 7, the apparatus includes a first determination module 72 and a first encapsulation module 74. The apparatus will be described below.

The determination module 72 is arranged to determine an exchange information set of service nodes on a service function chaining for processing a data packet. Herein, the exchange information set includes an intersection of the capabilities of the service nodes on the service function chaining. The encapsulation module 74 is connected with the foregoing determination module 72 and arranged to encapsulate the exchange information set in the data packet. Herein, the exchange information set is used for the service nodes to read a processing result which is obtained by processing the capability corresponding to the intersection of the capabilities of the service nodes and which is encapsulated in the data packet.

Figure 8:
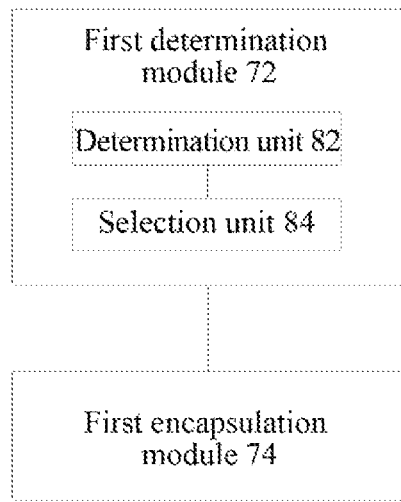
FIG. 8 is a block diagram illustrating an alternative structure of a determination module 72 in the first service node capability processing apparatus according to an embodiment of the present disclosure.

FIG. 8 is a block diagram illustrating an alternative structure of the first determination module 72 arranged in the first service node capability processing apparatus according to an embodiment of the present disclosure. As shown in FIG. 8, the first determination module 72 includes a determination unit 82 and a selection unit 84. The first determination module 72 will be described below.

The determination unit 82 is arranged to determine the capabilities of various service nodes on the service function chaining. The selection unit 84 is connected with the determination unit 82 and arranged to select the same capability of at least two service nodes as the intersection of the capabilities of the service nodes.

Figure 9:
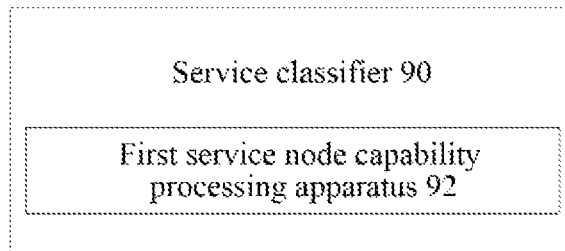
FIG. 9 is a block diagram illustrating the structure of a service classifier according to an embodiment of the present disclosure.

FIG. 9 is a block diagram illustrating a structure of a service classifier according to an embodiment of the present disclosure. As shown in FIG. 9, a service classifier 90 includes any foregoing first service node capability processing apparatus 92.

Figure 10:
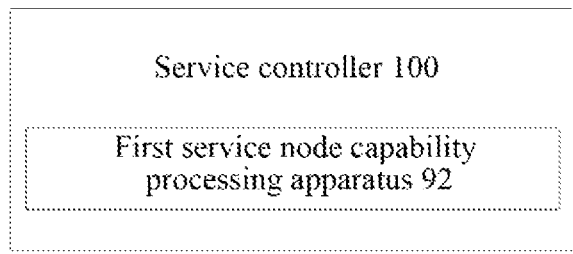
FIG. 10 is a block diagram illustrating the structure of a service controller according to an embodiment of the present disclosure.

FIG. 10 is a block diagram illustrating a structure of a service controller according to an embodiment of the present disclosure. As shown in FIG. 10, a service controller 100 includes any foregoing first service node capability processing apparatus 92.

Figure 11:
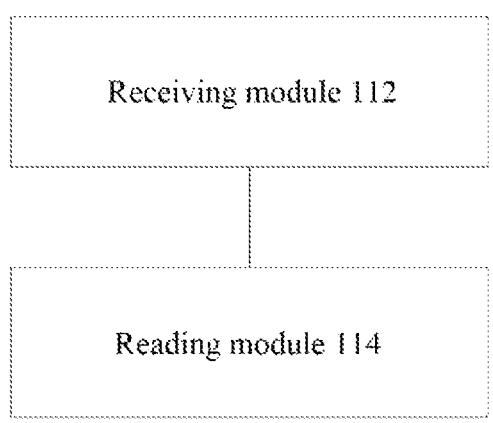
FIG. 11 is a block diagram illustrating the structure of a second service node capability processing apparatus according to an embodiment of the present disclosure.

FIG. 11 is a block diagram illustrating a structure of a second service node capability processing apparatus according to an embodiment of the present disclosure. As shown in FIG. 11, the apparatus includes a receiving module 112 and a reading module 114. The apparatus will be described below.

The receiving module 112 is arranged to receive a data packet carrying an exchange information set of the service nodes on a service function chaining. Herein, the exchange information set includes an intersection of the capabilities of the service nodes on the service function chaining. The reading module 114 is connected with the receiving module 112 and arranged to read, according to the exchange information set, a processing result which is obtained by processing the capability corresponding to the intersection of the capabilities of the service nodes and which is encapsulated in the data packet.

Figure 12:
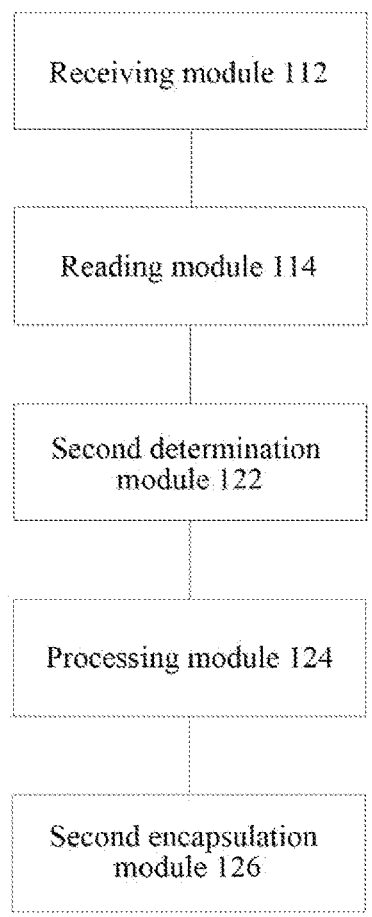
FIG. 12 is a first block diagram illustrating an alternative structure of the second service node capability processing apparatus according to an embodiment of the present disclosure.

FIG. 12 is a first block diagram illustrating an alternative structure of the second service node capability processing apparatus according to an embodiment of the present disclosure. As shown in FIG. 12, besides including all the structures shown in FIG. 11, the apparatus further includes a second determination module 122, a processing module 124 and a second encapsulation module 126. The apparatus will be described below.

The second determination module 122 is connected with the reading module 114 and arranged to determine that service node includes an intermediate node capability of which a processing result is not encapsulated in the data packet but the intermediate node capability is included in the exchange information set. The processing module 124 is connected with the second determination module 122 and arranged to process the intermediate node capability to acquire an intermediate node capability processing result. The second encapsulation module 126 is connected with the processing module 124 and arranged to encapsulate the intermediate node capability processing result in a data packet to be forwarded to the next service node.

Figure 13:
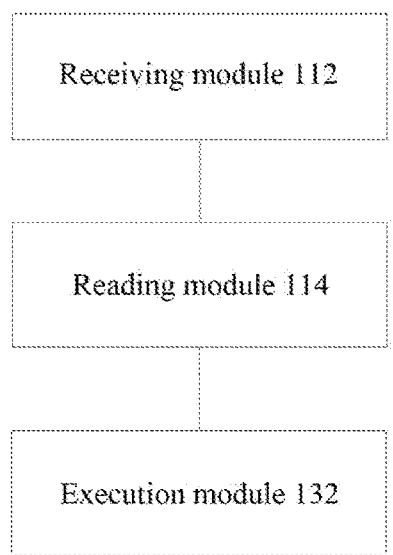
FIG. 13 is a second block diagram illustrating an alternative structure of the second service node capability processing apparatus according to an embodiment of the present disclosure.

FIG. 13 is a second block diagram illustrating an alternative structure of the second service node capability processing apparatus according to an embodiment of the present disclosure. As shown in FIG. 13, besides all the structures shown in FIG. 11, the apparatus further includes an execution module 132 which will be described below.

The execution module 132 is arranged to execute at least one of the following operations for the capability in the exchange information set: addition, deletion and modification.

Figure 14:
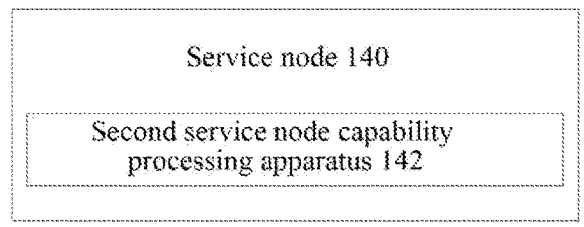
FIG. 14 is a block diagram illustrating a structure of a service node according to an embodiment of the present disclosure.

FIG. 14 is a block diagram illustrating a structure of a service node according to an embodiment of the present disclosure. As shown in FIG. 14, the service node 140 includes any foregoing second data packet list item processing apparatus 142.

In the related technology, the blind information exchange causes the waste of resources since the information exchange between nodes is untargeted. It should be pointed out that since a service node has a plurality of capabilities, only the table item processing capability of a service node is exemplified here. Other capabilities of a service node may also be realized by embodiments and alternative implementations of the present disclosure. For example, if a processing executed by an SF2 needs no ACL search, then the placing of an ACL search result in metadata by an SF1 is meaningless. Moreover, besides ACL, tables searched by the SF1 are a plenty of other types of table items, for example, QoS table, tunnel table and label table, etc. The processing results of the SF1 also are many. Thus, the SF1 needs to determine which table item search results and which processing result should be placed in Metadata and sent to the SF2. If all the table item search results and all the processing results are placed in Metadata, then the space of Metadata may be not enough for the storage of the plurality of table item search results. Moreover, information may be lost.

In embodiments of the present disclosure, by a process of informing an SF1 here of which parameter or result should be added in metadata, the effectiveness of information exchange between nodes is realized. For example, the foregoing defects can be overcome by adopting the solution of storing an exchange information type in metadata. The exchange information type may define an information type exchanged between nodes, for example, an ACL serial number represents an exchange information type, a user ID represents an exchange information type, and a DPI processing result represents an exchange information type and so on.

By using a method of storing an exchange information type in metadata, effective information is transferred between SFPs, thus avoiding the problem in the related technology that metadata field space is wasted due to the transfer of invalid exchange information. This method is described below.

After receiving a packet from the outside, a service classifier classifies the packet according to the field information of the packet and determines an SFP. The service classifier or controller analyzes all nodes on the SFP and sums up the intersections of all the table items involved in the service processing of all the nodes. Herein, the intersection of the table items related with all the nods in the SFP: the plurality of table items which the node 1 needs to search during a packet processing process, the plurality of table items which the node 2 needs to search during a packet processing process, the plurality of table items which the node 3 needs to search during a packet processing process . . . and the plurality of table items which the node N needs to search during a packet processing process. And a set of the same table items required to process is selected when process packet any two of nodes 1, 2, 3 . . . N is selected to process packets.

According to the intersection of the table items searched by all the nodes on the SFP, the service classifier or controller sums up an exchange information type set (that is, the foregoing exchange information set) necessary on the SFP. The service classifier encapsulates the exchange information type set in Metadata, sequentially completes the encapsulation needed by the SFC and sends the Metadata to the next processing node on the SFP.

Figure 15:
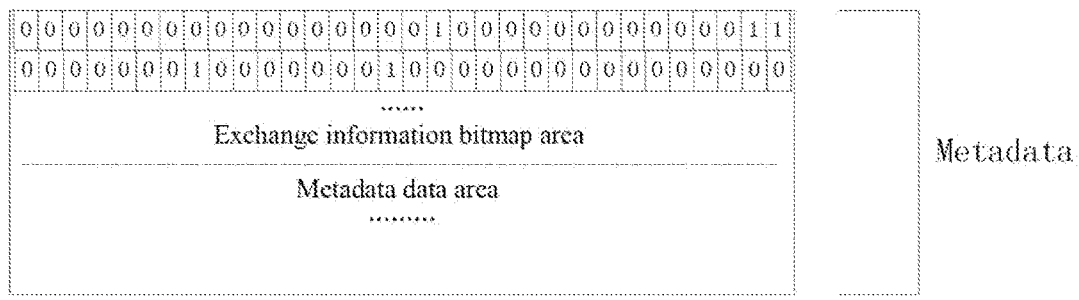
FIG. 15 is a schematic diagram illustrating the encapsulation of an exchange information type set in Metadata in a manner of a bitmap format according to an embodiment of the present disclosure.

Herein, the exchange information type set may be encapsulated in a plurality of manners, for example, FIG. 15 is a schematic diagram illustrating the encapsulation of an exchange information type set in Metadata in the manner of a bitmap format according to an embodiment of the present disclosure. As shown in FIG. 15, an exchange information type set is encapsulated in Metadata in the manner of a bitmap format, that is, each bit in the bitmap represents an exchange information type.

Figure 16:
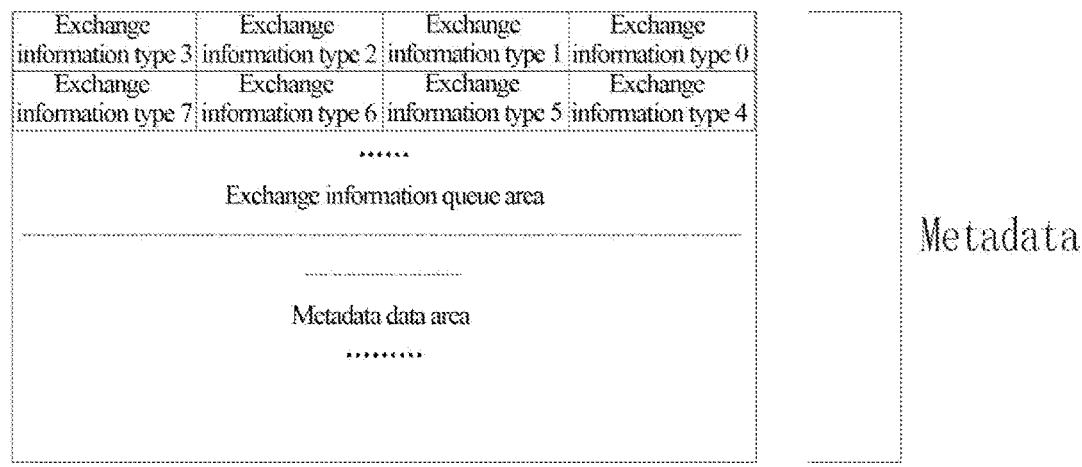
FIG. 16 is a schematic diagram illustrating the encapsulation of an exchange information type set in Metadata in a manner of a queue format according to an embodiment of the present disclosure.

For another example, FIG. 16 is a schematic diagram illustrating the encapsulation of an exchange information type set in Metadata in the manner of a queue format according to an embodiment of the present disclosure. As shown in FIG. 16, an exchange information type set is encapsulated in Metadata is in the manner of a queue format, that is, each item in a queue represents one exchange information type.

After the packet reaches the next processing node, a related table item is searched for according to the service characteristic of the node, meanwhile, the exchange information type set included in Metadata is parsed. If the type of the table item is included in the exchange information type set, then the search result of the list item is recorded, and the result is encapsulated in Metadata for use by the subsequent processing nodes. Otherwise, the search result of the table item is not recorded in Metadata.

The node may add or delete one or more exchange information types in Metadata when the packet is processed by each processing node in SFP.

By carrying out the foregoing processing, effective information is transferred between the nodes on the SFP, thus avoiding the problem in the related technology that Metadata field space is wasted due to transfer of invalid exchange information.

The present disclosure is described below with reference to alternative embodiments.

First Alternative Embodiment

Figure 17:
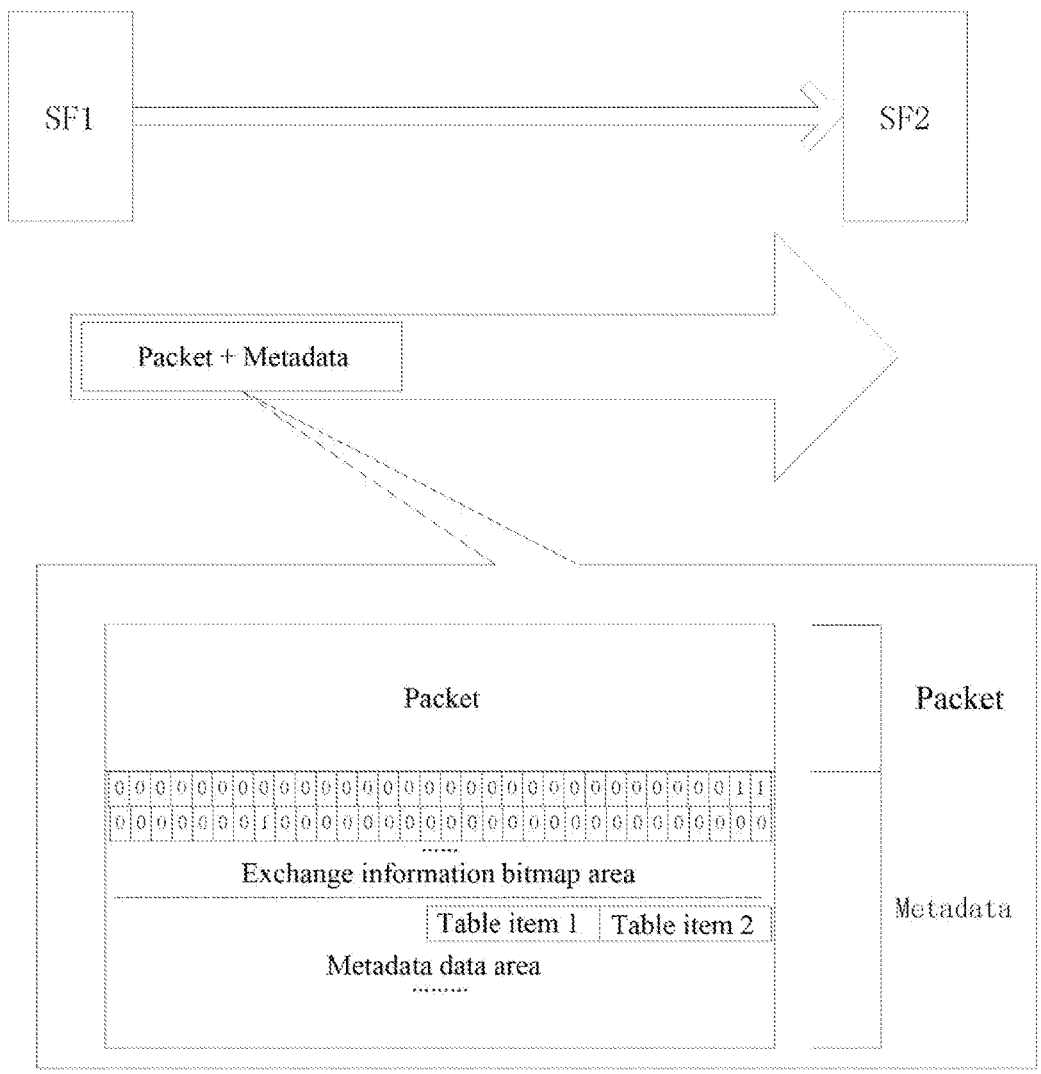
FIG. 17 is a diagram illustrating an embodiment of a deployment scenario based on an SFP1 according to a first alternative embodiment of the present disclosure.

FIG. 17 is a diagram illustrating an embodiment of a deployment scenario based on an SFP1 (SF1-SF2) according to a first alternative embodiment of the present disclosure. As shown in FIG. 17, in the embodiment, the following steps are included.

In step 101, a network manager configures that a packet of a user needs to be processed by an SF1 and an SF2 when processed by a gateway.

In step 102, the user sends a packet to access an external network.

In step 103, after receiving the packet, a classifier classifies the packet according to the configuration strategy in step 101 and generates an SFP1; herein the SFP1 passes two service function instances including the SF1 and the SF2.

In step 104, the SF1 processes the packet, which requires the processing of table items 1, 2 and 3, and the SF2 processes the packet, which requires the processing of table items 1, 2 and 4.

In step 105, according to the analysis and computation result obtained in step 104, the classifier obtains that the exchange information type of the whole service function chaining include table items 1 and 2.

In step 106, the classifier assigns a field of a 128-bit bitmap and sets the zeroth bit and the first bit of the bitmap to be '1' and the other bits to be '0'. Herein, the zeroth bit of the bitmap represents the table item 1, and the first bit of the bitmap represents the table item 2.

In step 107, the classifier encapsulates the field of the 128-bit bitmap in the packet and sends the packet to the service function instance of the SF1.

In step 108, the service function instance of the SF1 performs processing on the table items 1, 2 and 3 and reads the field of the 128-bit bitmap, and finds that the zeroth bit and the first bit of the bitmap are '1'. Thus, the service function instance of the SF1 adds the results of the table items 1 and 2 in Metadata and sends the Metadata to the service function instance of the SF2.

In step 109, after receiving the packet sent from the service function instance of the SF1, the service function instance of the SF2 reads the field of the 128-bit bitmap, and finds that the zeroth bit and the first bit are '1'. The service function instance of the SF2 directly reads the results of the table items 1 and 2 from Metadata, thus avoiding the repeated search of the table items 1 and 2 and improving the processing efficiency of a service function instance of firewall.

In step 110, after being processed by the service function instances of the SF1 and SF2, the packet is sent to a network.

Second Alternative Embodiment

Figure 18:
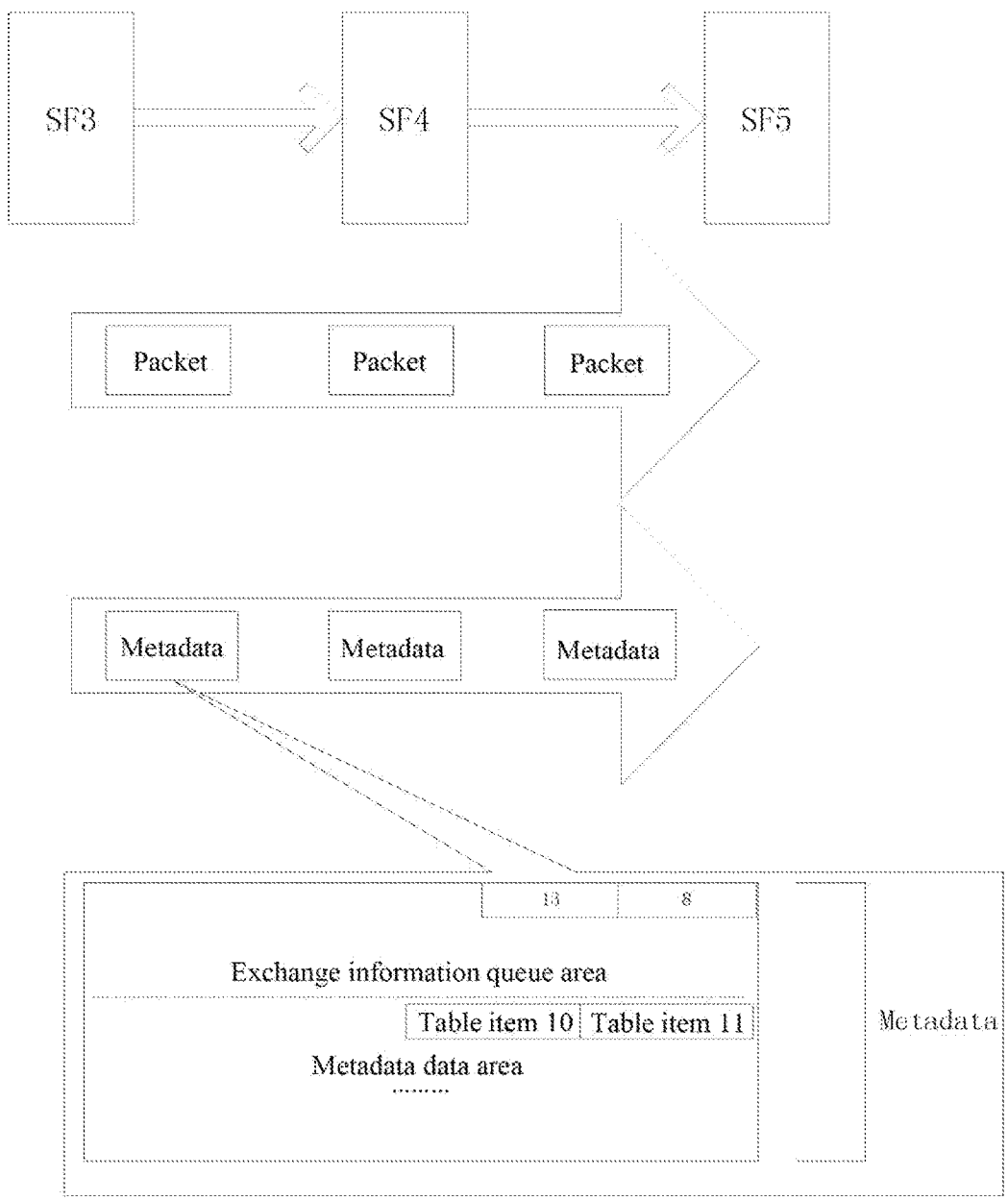
FIG. 18 is a diagram illustrating an embodiment of a deployment scenario based on an SFP2 according to a second alternative embodiment of the present disclosure.

FIG. 18 is a diagram illustrating an embodiment of a deployment scenario based on an SFP2 (SF3-SF4-SF5) according to a second alternative embodiment of the present disclosure. As shown in FIG. 18, in the embodiment, the following steps are included.

In step 201, a network manager configures that a packet of a user needs to be processed by an SF3, an SF4 and an SF5 when processed by a gateway.

In step 202, the packet processing by the SF3 requires the processing of three table items 10, 11 and 12; and the packet processing by the SF4 requires the processing of three table items 10, 11 and 13, and the packet processing by the SF5 requires the processing of two table items 10 and 11.

In step 203, according to the analysis and computation result obtained in step 202, an SFC controller obtains the exchange information types of the whole service function chaining including the table items 10 and 11.

In step 204, the SFC controller sends the SFP2 and the exchange information type of the user to a classifier.

In step 205, the user sends a packet to access an external network.

In step 206, after receiving the packet, the classifier assigns a two-byte field, and sets the zeroth byte of the field to be 8 and the first byte to be 13. The field value 8 represents the exchange information type is a table item 10, and the field value 13 represents the exchange information type is a table item 11. The classifier re-encapsulates the field into a new Metadata packet according to an IP address of the next node.

In step 207, the classifier sends the packet and the Metadata packet to a service function instance of the SF3 sequentially.

In step 208, the service function instance of the SF3 performs processing on the table items 10, 11 and 12 and reads the Metadata packet, and finds that the zeroth byte is 8 and the first byte is 13. Thus, the SF3 service adds the results of the table items 10 and 11 in the Metadata packet and sends the results to a service function instance of the SF4 together with the packet.

In step 209, after receiving the packet sent by the service function instance of the SF3, the service function instance of the SF4 reads the Metadata packet to find that the zeroth byte is 8 and the first byte is 13. The service function instance of the SF4 directly reads the results of the table items 10 and 11 in Metadata and then searches and processes the table item 13. The, the service function instance of the SF4 sends the packet and the Metadata packet to a service function instance of the SF5.

In step 210, after receiving the packet sent by the service function instance the SF4, the service function instance of the SF5 reads the Metadata packet to find that the zeroth byte is 8 and the first byte is 13 Thus, the service function instance of the SF5 directly reads the results of the table items 10 and 11 in Metadata and then completes corresponding processing of the SF5.

In step 211, after being processed by the service function instances of the SF3. SF4 and SF5, the packet is sent to a network.

Apparently, it should be understood by those skilled in the art that each of foregoing modules or steps described in the present disclosure can be realized by a universal computing device and that the modules or steps may be integrated on a single computing device or distributed on a network consisting of a plurality of computing devices, alternatively, the modules or steps may be realized by executable program codes so that the modules or steps can be stored in a memory to be executed by a computing device. Besides, in some cases, the steps shown or described herein can be executed in a sequence different from those described herein, or the modules or steps are formed into various integrated circuit modules, or the plurality of the modules or steps are formed into single integrated circuit module. Therefore, the present disclosure is not limited to the combination of specific hardware and software.

The foregoing embodiments are merely alternative embodiments of the present disclosure, which is not intended to limit the present disclosure and a variety of modifications and variations can be devised by those of ordinary skilled in the art. Any modification, equivalent substitute and improvement that can be devised by those of ordinary skill in the art without departing from the spirit of the present disclosure and that the modifications and improvements shall fall within the protection scope of the present disclosure.

INDUSTRIAL APPLICABILITY

As stated above, the embodiments and the alternative implementations of the present disclosure address the problem in the related technology that the blind information exchange causes the waste of resources since the information exchange between nodes is untargeted, and consequentially effectively prevent the waste of field resources by invalid information exchange.

What we claim is:

1. A service node capability processing method, comprising:
   determining an exchange information set of service nodes on a service function chaining for processing a data packet, wherein the exchange information set includes an intersection of capabilities of the service nodes on the service function chaining; and
   encapsulating the exchange information set in the data packet, wherein the exchange information set is used for the service nodes to read a processing result which is obtained by processing a capability corresponding to the intersection of the capabilities of the service nodes and which is encapsulated in the data packet;
   wherein determining an exchange information set of service nodes on a service function chaining for processing a data packet comprises:
   determining the capabilities of various service nodes on the service function chaining; and
   selecting a same capability of at least two service nodes on the service function chaining as the intersection of the capabilities of the service nodes;
   wherein after a service node reads, according to the exchange information set, the processing result which is obtained by processing a capability corresponding to the intersection of the capabilities of the service nodes and which is encapsulated in the data packet, when the service node determines that the service node includes an intermediate node capability of which a processing result is not encapsulated in the data packet but the intermediate node capability is included in the exchange information set, the service node processes the intermediate node capability to acquire an intermediate node capability processing result, and encapsulates the intermediate node capability processing result in a data packet to be forwarded to the next service node.

2. The method according to claim 1, wherein the exchange information set is encapsulated in the data packet through at least one of the following manners: in a manner of a bitmap format, and in a manner of a queue format.

3. A service node capability processing method, comprising:
   receiving a data packet carrying an exchange information set of service nodes on a service function chaining, wherein the exchange information set includes an intersection of capabilities of the service nodes on the service function chaining; and
   reading, according to the exchange information set, a processing result which is obtained by processing a capability corresponding to the intersection of the capabilities of the service nodes and which is encapsulated in the data packet;
   wherein the exchange information set of service nodes on the service function chaining is determined by:
   determining the capabilities of various service nodes on the service function chaining; and
   selecting a same capability of at least two service nodes on the service function chaining as the intersection of the capabilities of the service nodes;
   wherein after the step of reading, according to the exchange information set, a processing result which is obtained by processing a capability corresponding to the intersection of the capabilities of the service nodes and which is encapsulated in the data packet, the method further comprises:
   determining that the service node includes an intermediate node capability of which a processing result is not encapsulated in the data packet but the intermediate node capability is included in the exchange information set;
   processing the intermediate node capability to acquire an intermediate node capability processing result; and
   encapsulating the intermediate node capability processing result in a data packet to be forwarded to the next service node.

4. The method according to claim 3, wherein after the step of reading, according to the exchange information set, a processing result which is obtained by processing a capability corresponding to the intersection of the capabilities of the service nodes and which is encapsulated in the data packet, the method further comprises:
   executing at least one of the following operations for the capability included in the exchange information set: addition, deletion and modification.

5. A service node capability processing apparatus, comprising at least one computing device configured to execute program codes stored in a non-transitory memory to perform the following steps:
   determining an exchange information set of service nodes on a service function chaining for processing a data packet, wherein the exchange information set includes an intersection of capabilities of the service nodes on the service function chaining; and
   encapsulating the exchange information set in the data packet, wherein the exchange information set is used for the service nodes to read a processing result which is obtained by processing a capability corresponding to the intersection of the capabilities of the service nodes and which is encapsulated in the data packet;
   wherein determining an exchange information set of service nodes on a service function chaining for processing a data packet comprises:
   determining the capabilities of various service nodes on the service function chaining; and
   selecting a same capability of at least two service nodes on the service function chaining as the intersection of the capabilities of the service nodes;
   wherein after a service node reads, according to the exchange information set, the processing result which is obtained by processing a capability corresponding to the intersection of the capabilities of the service nodes and which is encapsulated in the data packet, when the service node determines that the service node includes an intermediate node capability of which a processing result is not encapsulated in the data packet but the intermediate node capability is included in the exchange information set, the service node processes the intermediate node capability to acquire an intermediate node capability processing result, and encapsulates the intermediate node capability processing result in a data packet to be forwarded to the next service node.

6. A service classifier comprising the apparatus of claim 5.

7. A service controller comprising the apparatus of claim 5.

8. A service node capability processing apparatus, comprising at least one computing device configured to execute program codes stored in a non-transitory memory to perform the following steps:

receiving a data packet carrying an exchange information set of service nodes on a service function chaining, wherein the exchange information set includes an intersection of capabilities of the service nodes on the service function chaining; and reading, according to the exchange information set, a processing result which is obtained by processing a capability corresponding to the intersection of the capabilities of the service nodes and which is encapsulated in the data packet;

wherein the exchange information set of service nodes on the service function chaining is determined by:

determining the capabilities of various service nodes on the service function chaining; and selecting a same capability of at least two service nodes on the service function chaining as the intersection of the capabilities of the service nodes;

wherein the at least one computing device is further configured to execute program codes stored in the non-transitory memory to perform following steps:

determining that the service node includes an intermediate node capability of which a processing result is not encapsulated in the data packet but the intermediate node capability is included in the exchange information set;

processing the intermediate node capability to acquire an intermediate node capability processing result; and encapsulating the intermediate node capability processing result in a data packet to be forwarded to the next service node.

9. The apparatus according to claim 8, wherein the at least one computing device is further configured to execute program codes stored in the non-transitory memory to perform the following step:

executing at least one of the following operations for the capability in the exchange information set: addition, deletion and modification.

10. A service node comprising the apparatus of claim 9.

11. A service node comprising the apparatus of claim 8.

* * * * *